United States Patent
Hidaka

(10) Patent No.: US 9,930,221 B2
(45) Date of Patent: Mar. 27, 2018

(54) PRINTING APPARATUS, PRINTING APPARATUS CONTROL METHOD, AND STORAGE MEDIUM FOR REDUCING A PERIOD OF TIME BETWEEN STARTING OF A COPY PROCESS FOR A PRESET PLURALITY OF COPIES TO WHEN THE COPY PROCESS IS TERMINATED

(71) Applicant: CANON KABUSHIKI KAISHA, Tokyo (JP)

(72) Inventor: Keita Hidaka, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/835,425

(22) Filed: Aug. 25, 2015

(65) Prior Publication Data
US 2016/0062711 A1 Mar. 3, 2016

(30) Foreign Application Priority Data
Aug. 27, 2014 (JP) .................................. 2014-172354

(51) Int. Cl.
G06F 3/12 (2006.01)
H04N 1/64 (2006.01)

(52) U.S. Cl.
CPC ............. *H04N 1/648* (2013.01); *H04N 1/644* (2013.01); *H04N 2201/0094* (2013.01)

(58) Field of Classification Search
None
See application file for complete search history.

(56) References Cited

U.S. PATENT DOCUMENTS

| 2007/0147867 A1* | 6/2007 | Sekiya | G03G 15/5004 399/75 |
| 2011/0090533 A1* | 4/2011 | Shimizu | G06F 3/1222 358/1.15 |
| 2014/0036289 A1* | 2/2014 | Muroi | H04N 1/21 358/1.13 |

FOREIGN PATENT DOCUMENTS

| CN | 101136986 A | 3/2008 |
| CN | 101299792 A | 11/2008 |
| CN | 103139426 A | 6/2013 |
| JP | 2002-314763 A | 10/2002 |
| JP | 2004-287519 A | 10/2004 |

\* cited by examiner

*Primary Examiner* — Andrew H Lam
(74) *Attorney, Agent, or Firm* — Canon USA, Inc. I.P. Division

(57) ABSTRACT

In general, a determination as to whether image data generated by reading an image of a document is read from a first storing unit or a second storing unit may not be made in accordance with a result of a determination as to whether printing is performed on a first set or a second set onward among sets to be printed. Accordingly, a control method in a printing apparatus includes reading a document, storing image data of the document in a first storing unit, storing the image data read from the first storing unit in a second storing unit, and performing printing based on the image data read from the first storing unit when the printing is performed on a first set and performing printing based on the image data read from the second storing unit when the printing is performed on a second set onward.

14 Claims, 15 Drawing Sheets

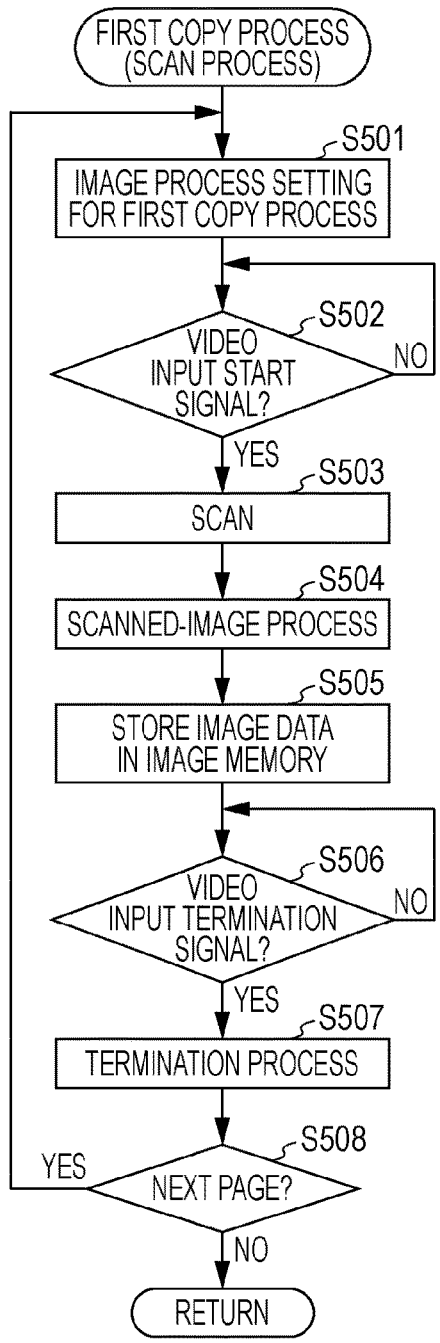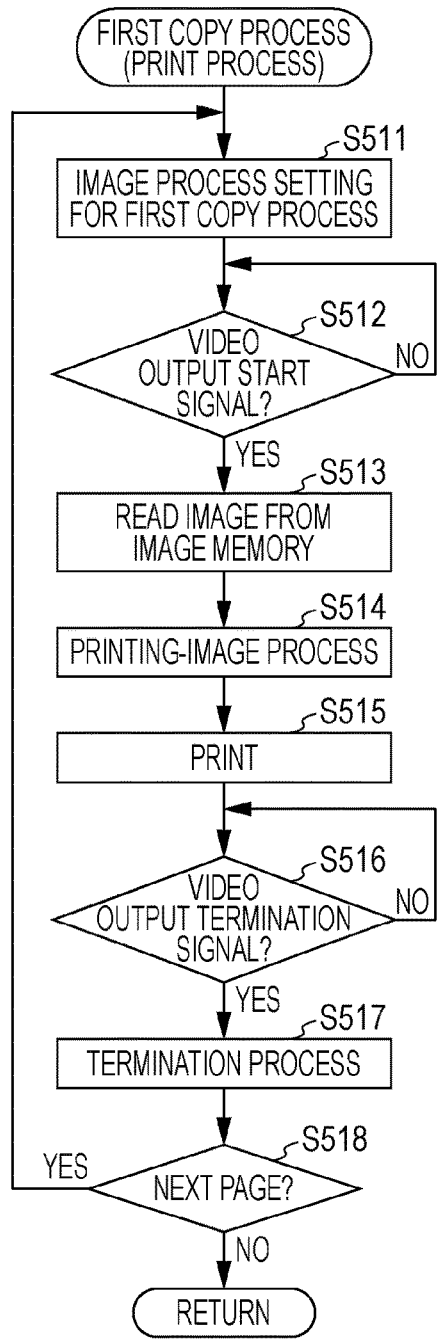

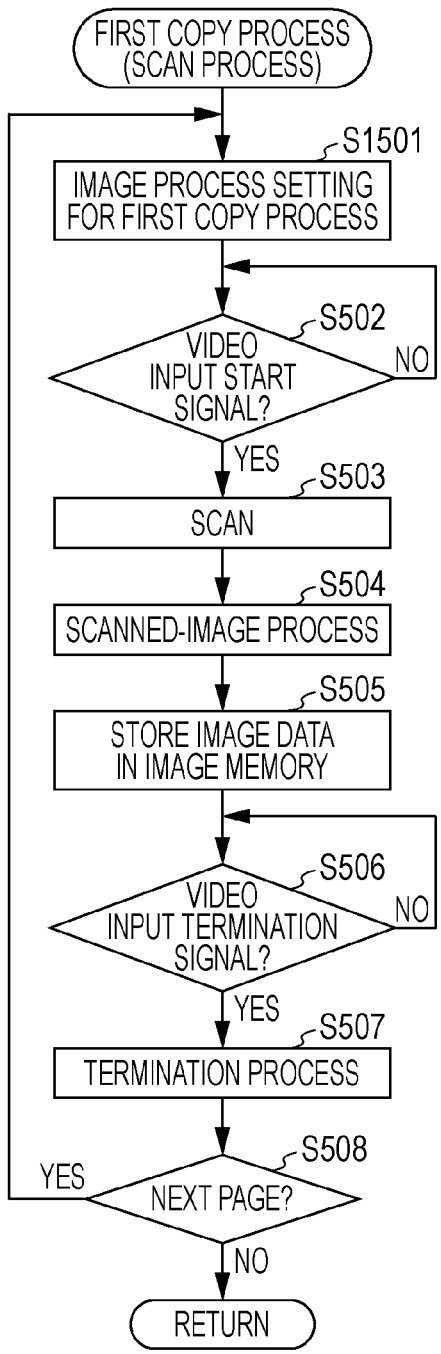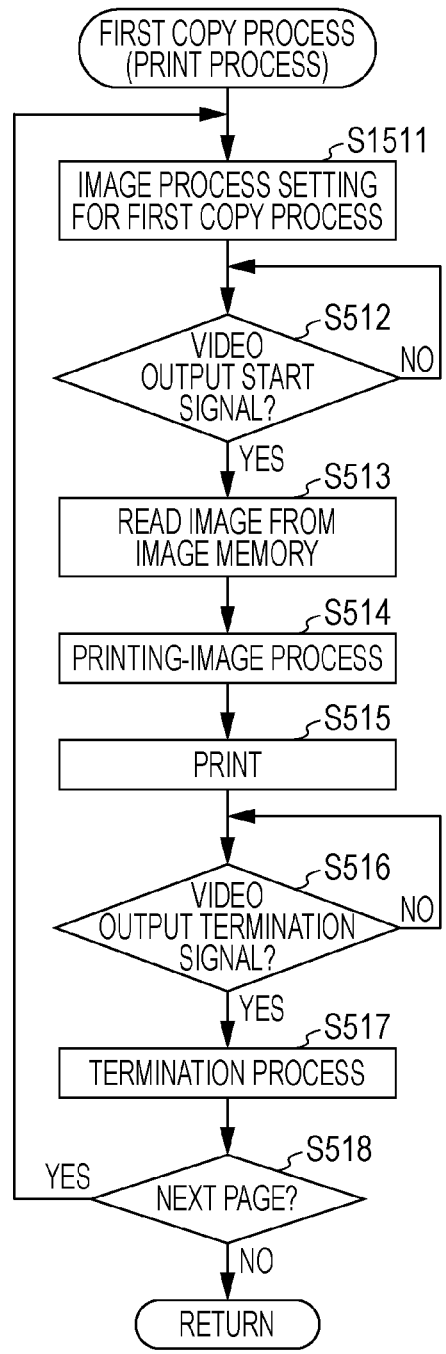

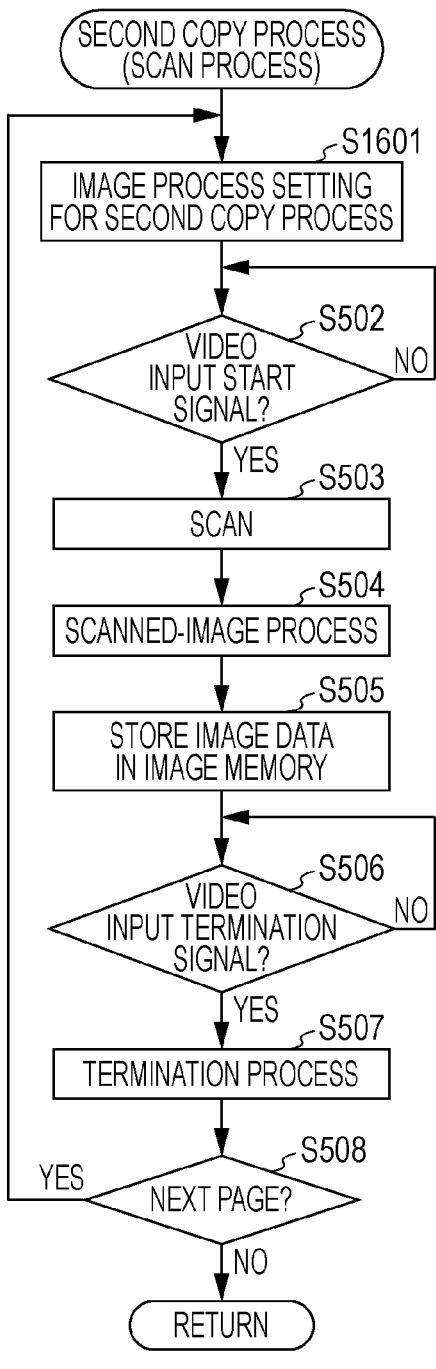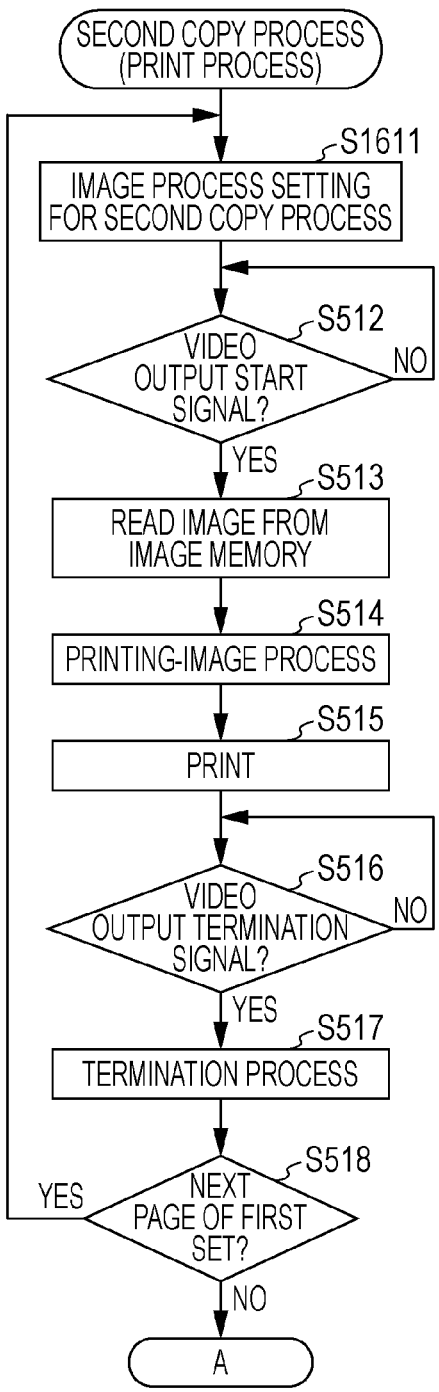

US 9,930,221 B2

PRINTING APPARATUS, PRINTING APPARATUS CONTROL METHOD, AND STORAGE MEDIUM FOR REDUCING A PERIOD OF TIME BETWEEN STARTING OF A COPY PROCESS FOR A PRESET PLURALITY OF COPIES TO WHEN THE COPY PROCESS IS TERMINATED

BACKGROUND OF THE INVENTION

Field of the Invention

The present invention relates to a printing apparatus which executes printing, a method for controlling the printing apparatus, a program, and a storage medium.

Description of the Related Art

In general, an image of a document is read by two methods including a skimming method and an optical system moving method. In the skimming method, a document is placed on a document tray and an image of the document is read in a position of a fixed optical system while the document is conveyed by an automatic document feeder (ADF).

In the optical system moving method, a document is placed on a platen glass and an image of the document in a fixed document position is read while an optical system is moved.

Furthermore, a technique of reducing a period of time from when an image of a document is read by the optical system moving method to when the image is output to a sheet based on image data generated by reading a first page of the document (First Copy Out Time (FCOT)) is widely used.

As such a technique, the following technique is widely used. A processing speed of a scanner and a processing speed of a printer are calculated in accordance with copy setting information including enlargement and reduction. Furthermore, a print start timing in a case where the processing speed of the scanner is higher than the processing speed of the printer and a print start timing in a case where the processing speed of the scanner is lower than the processing speed of the printer are individually calculated. Then a print start timing is controlled in accordance with the processing speed of the scanner and the processing speed of the printer (refer to Japanese Patent Laid-Open No. 2002-314763).

Furthermore, the following technique is also widely used. A compression rate in a case where a collating process is performed and a compression rate in a case where a collating process is not performed are individually calculated in accordance with a transfer rate between an image processing apparatus and a print controlling apparatus, the size of a target image of a print job, and a processing speed of an engine. Then the compression rate of image data generated by reading an image of a document in accordance with an output format of the print job (a determination as to whether the collating process has been performed) is controlled (refer to Japanese Patent Laid-Open No. 2004-287519).

In an image forming apparatus having the scan function and the print function described above, when the preset number of sets of copy is 1, the FCOT may be reduced without compressing image data generated by reading an image of a document.

On the other hand, when a plurality of number of sets are to be copied, a period of time in which image data is read from and write to a storage unit may be reduced by compressing image data generated by reading an image of a document.

However, a determination as to whether image data generated by reading an image of a document is to be compressed in accordance with the number of sets which is set when a copy job is executed may not be performed.

SUMMARY OF THE INVENTION

The present invention provides a printing apparatus including a reading unit configured to read a document, a printing unit configured to execute printing based on image data, a first storing unit configured to store image data of the document read by the reading unit, and a second storing unit configured to store the image data read from the first storing unit. The printing unit executes printing based on the image data read from the first storing unit in a case where printing is performed on a first set among sets to be printed by the printing unit, and executes printing based on the image data read from the second storing unit in a case where printing is performed on a second set onward among the sets to be printed by the printing unit.

Further features of the present invention will become apparent from the following description of exemplary embodiments with reference to the attached drawings.

BRIEF DESCRIPTION OF THE DRAWINGS

FIGS. 5A and 5B are flowcharts illustrating control operations according to the first embodiment.

FIGS. 15A and 15B are flowcharts illustrating control operations according to a third embodiment.

FIGS. 16A and 16B are flowcharts illustrating control operations according to the third embodiment.

DESCRIPTION OF THE EMBODIMENTS

Hereinafter, embodiments of the present invention will be described in detail with reference to the accompanying drawings. The embodiments herein do not limit the scope of the claims of the present invention, and it is not necessarily the case that all combinations of components described in the embodiments are required for solving means of the present invention.

System Configuration

First Embodiment

Figure 1:
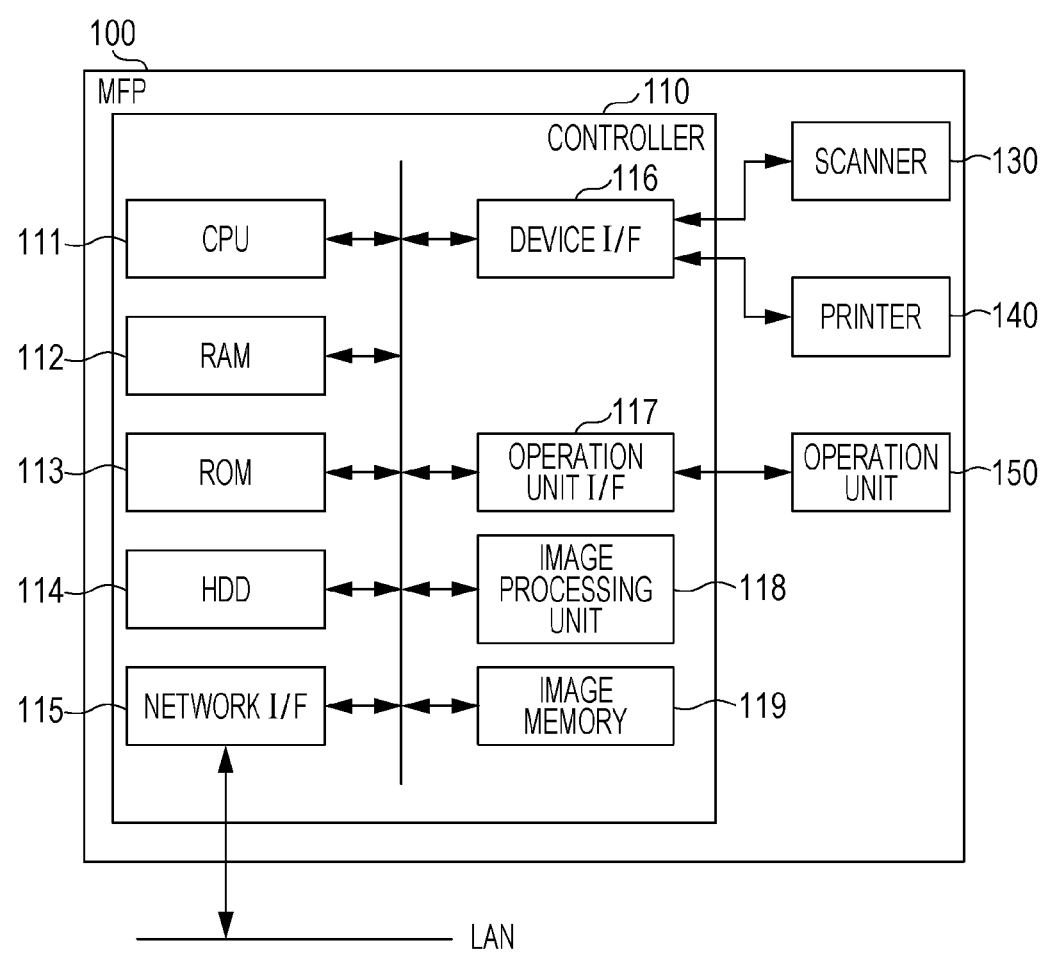
FIG. 1 is a block diagram illustrating a configuration of an MFP according to a first embodiment.

FIG. 1 is a block diagram illustrating a configuration of an MFP 100 used as an image forming apparatus according to the present invention.

In FIG. 1, a controller 110 is connected to a scanner unit 130 serving as an image input device and a printer unit 140 serving as an image output device so as to control input and output of image information. Furthermore, the controller 110 is connected to a local area network (LAN) and performs processes including reception of a print job from an external apparatus (information processing apparatus), such as a personal computer (PC), through the LAN.

A CPU 111 controls operation of the MFP 100. The CPU 111 operates in accordance with a program stored in a random access memory (RAM) 112. A read-only memory (ROM) 113 is a boot ROM which stores a boot program of a system.

A hard disk drive (HDD) 114 stores system software, image data, a program used to control the operation of the MFP 100, and the like. The program stored in the HDD 114 is loaded in the RAM 112, and the CPU 111 controls the operation of the MFP 100 in accordance with the loaded program. Note that the HDD 114 is configured such that, when a copy job is set, compression image data obtained when an image processing unit 118 compresses image data read by the scanner unit 130 corresponding to a plurality of pages may be temporarily stored in the HDD 114.

A network interface (I/F) 115 connected to the LAN performs input and output of various information through a network. A device I/F 116 is used to connect the scanner unit 130 and the printer unit 140 which are the image input device and the image output device, respectively, to the controller 110 and performs conversion between synchronous and asynchronous of image data.

An operation unit I/F 117 is an interface for connecting an operation unit 150 and the controller 110 to each other, and outputs image data to be displayed on the operation unit 150 to the operation unit 150. Furthermore, the operation unit I/F 117 transmits information input by a user using the operation unit 150 to the CPU 111.

The image processing unit 118 performs an image process on print data received through the LAN and performs an image process on image data input or output through the device I/F 116. An image memory 119 temporarily develops the image data processed by the image processing unit 118, and the developed image data is written in the image memory 119.

Figure 2:
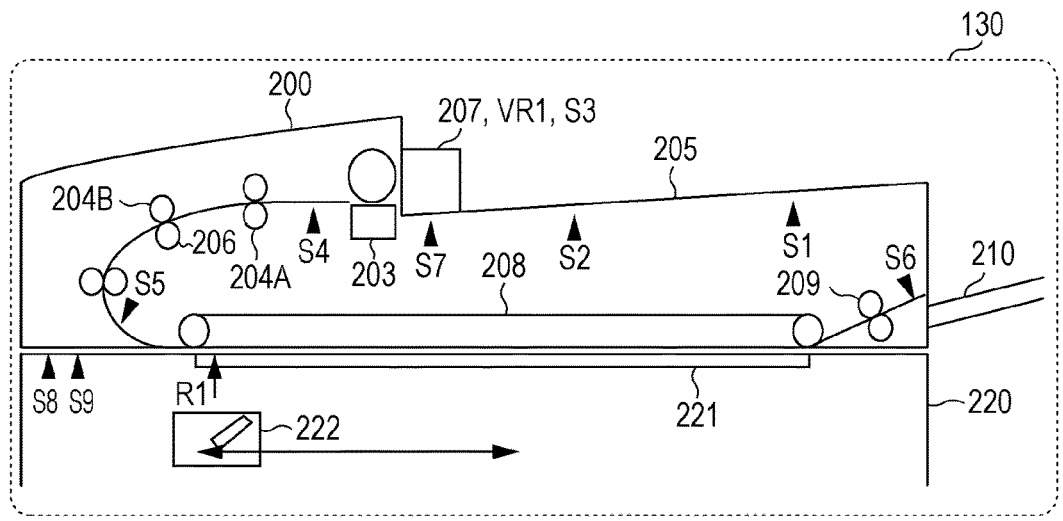
FIG. 2 is a cross-sectional view illustrating a configuration of a scanner unit according to the first embodiment.

FIG. 2 is a cross-sectional view illustrating a configuration of the scanner unit 130 illustrated in FIG. 1 in detail.

According to FIG. 2, the scanner unit 130 includes a document tray 205 serving as a document loading unit, and a document is placed on a surface of the document tray 205. A document feeding unit included in a document conveying apparatus 200 guides a bundle of documents mounted on feeding rollers (not illustrated) serving as a feeding unit and the document tray 205 to a separation unit 203 so that the bundle of documents are separated one by one from a top of the bundle of documents and conveys the separated documents to conveying rollers 204A and 204B.

Registration rollers 206 are not moved when a leading end of a document is reached. An oblique motion of the document is corrected by forming a loop in conveyance through the conveying rollers 204A and 204B, and the document is conveyed to a document reading unit. The document reading unit included in the document conveying apparatus 200 conveys the document supplied from the document feeding unit described above to a position R1 at a predetermined speed using the registration rollers 206 and a reading belt 208.

When the leading end of the document reaches the reading position R1, an optical unit 222 which is fixed in the reading position R1 performs an exposure operation and performs a reading operation while the document is conveyed. This reading method is referred to as a "skimming mode" hereinafter.

On the other hand, when an trailing end of the document reaches the reading position R1, the movement of the document is stopped and scanning is performed on the document while the document is exposed by the optical unit 222 so that a reading operation may be performed while the optical unit 222 is moved. This reading method is referred to as an "optical system moving mode" hereinafter.

After the reading of the document is terminated, the reading belt 208 conveys the document to a document ejection unit. The document ejection unit ejects the document by sheet ejection rollers 209 to a sheet ejection tray 210.

In FIG. 2, reference symbols S1 to S6 and VR1 denote various sensors which are disposed in the document conveying apparatus 200. A large-size detection sensor S1 and a small-size detection sensor S2 which detect a length, and a width detection volume VR1 and a width detection sensor S3 which are disposed in a document width guide 207 are included in the document tray 205.

The document conveying apparatus 200 further includes a size sensor S4 which detects a document which is separately supplied by detecting a leading end and a trailing end of the document and which simultaneously measures a length of the document, a read sensor S5 which detects the leading end of the document and transmits a reading signal, and a sheet ejection sensor S6. The document conveying apparatus 200 further includes a document setting sensor S7 which determines whether a document has been set on the document tray 205.

An image reader 220 incorporates open/close detection sensors S8 and S9 which detect an open angle and a close angle of the document conveying apparatus 200. When the user places a document on a platen glass 221, the image reader 220 specifies the size of the document placed on the platen glass 221 using the open/close detection sensors S8 and S9, a size sensor (not illustrated), and the exposure operation.

In a case where the user places a document on the platen glass 221, an image of the document is read, as with the optical system moving mode, when the optical unit 222 performs scanning while performing exposure, that is, the image of the document is read while the optical unit 222 is moved (this method is referred to as an "optical system moving method").

Figure 3:
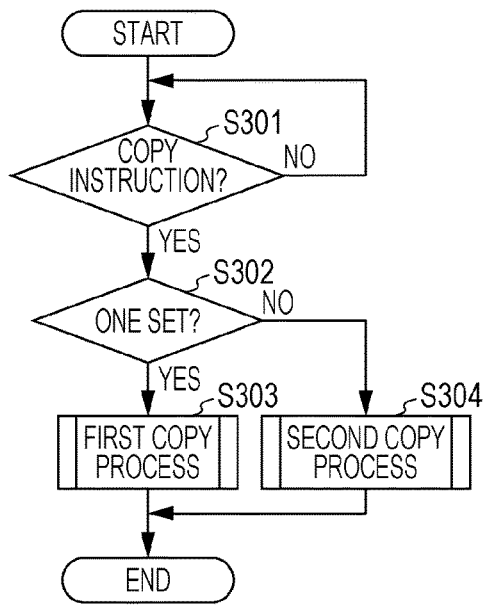
FIG. 3 is a flowchart illustrating a control operation according to the first embodiment.

FIG. 3 is a flowchart illustrating a method for controlling the image forming apparatus according to the first embodiment. In this example, the MFP 100 illustrated in FIG. 1 executes a copy job. Operations in steps described below are realized when the CPU 111 executes the control program stored in the HDD 114. Specifically, this process is executed when the program stored in the HDD 114 is developed in the RAM 112 and executed by the CPU 111. First, in step S301, the CPU 111 waits for a copy instruction issued by the user using the operation unit 150. When it is determined that the user has input a copy instruction in step S301 (Yes in step S301), the CPU 111 proceeds to step S302. On the other hand, when it is determined that a copy instruction has not been input (No in step S301), the CPU 111 repeatedly performs the process in step S301 until a copy instruction is input.

In step S302, the CPU 111 determines whether the number of sets set by the operation unit 150 is 1. When it is determined that the number of sets is 1 (Yes in step S302), the CPU 111 proceeds to step S303. On the other hand, when it is determined that the number of sets is 2 or more (No in step S302), the CPU 111 proceeds to step S304.

In step S303, the CPU 111 executes a first copy process which will be described in detail hereinafter with reference to FIGS. 4 to 6. After the first copy process is terminated, this process is terminated.

In step S304, the CPU 111 executes a second copy process which will be described in detail hereinafter with reference to FIGS. 7 to 10. After the second copy process is terminated, this process is terminated.

Figure 4:
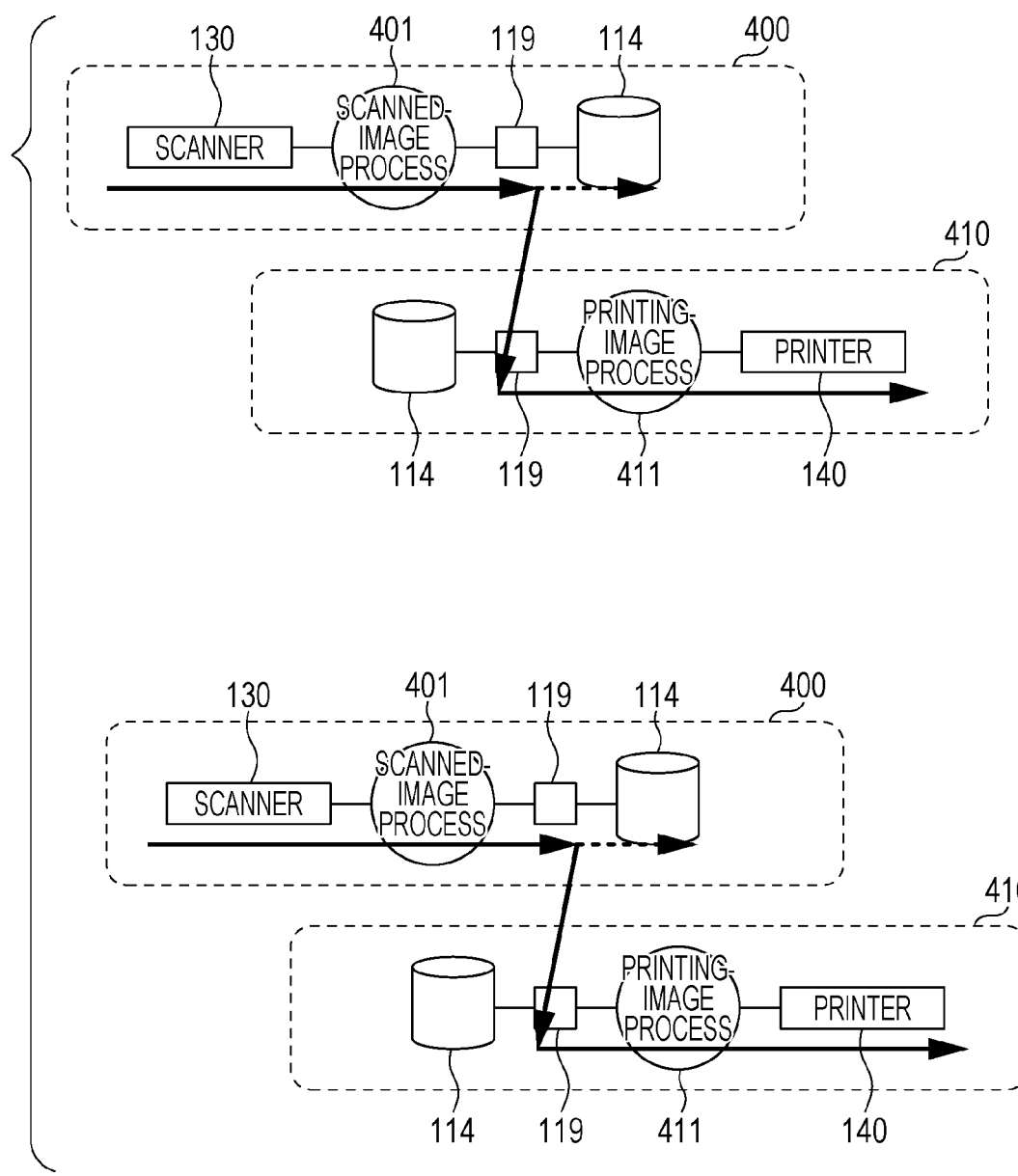
FIG. 4 is a diagram illustrating a processing order of a first copy process.

FIG. 4 is a diagram illustrating a processing order of the first copy process.

In FIG. 4, an example of a copy process performed when a copy job is input in a state in which two documents are placed on the document tray 205 of the document conveying apparatus 200 and the number of sets is 1 is illustrated. From the top of FIG. 4, a flow of a process of reading first and second pages of the document and a process of printing the first and second pages is illustrated.

The first copy process performed in step S303 described above is characterized in that a scan process and a print process are performed on each page in parallel and a process of compressing image data with a low compression rate is performed when a scanned image is processed. Note that the first copy process is a characteristic process executed when the number of sets is 1.

In FIG. 4, the entire scan process is schematically illustrated as a process 400. The entire print process is schematically illustrated as a process 410.

The MFP 100 realizes a copy process operation by combining the scan process corresponding to the process 400 and the print process corresponding to the process 410 with each other. The CPU 111 performs control such that the process 400 and the process 410 are executed in parallel so that a processing time which is a period of time from when the document is read to when the document is output to a sheet based on generated image data is reduced. A process for one page is completed by a series of processes performed by the scanner unit 130 and the printer unit 140. Note that the copy process is performed on a page-by-page basis.

A scanned-image processing unit 401 included in the image processing unit 118 performs an image process on scanned image data (which is referred to as a "scanned-image process"). Furthermore, the scanned-image processing unit 401 has a function of an image compression process and performs the compression process on image data within a designated compression rate.

The image memory 119 develops the image data which has been subjected to the scanned-image process performed by the scanned-image processing unit 401 in the process 400. The image memory 119 reads the image data to a printing-image processing unit 411 in the process 410.

The HDD 114 stores print data for printing which has been developed in the image memory 119 in the process 400. The HDD 114 is not associated with the process 410.

The printing-image processing unit 411 included in the image processing unit 118 performs an image process on image data to be printed (which is referred to as a "printing-image process"). A processing order of the first copy process performed by the MFP 100 is represented by arrow marks in FIG. 4.

In the first embodiment, a region allocated in the image memory 119 is shared by a scan side and a print side. Before writing by the scanned-image processing unit 401 is completed, reading to the printing-image processing unit 411 is started. In this way, the process is realized.

In the first copy process performed in a case where the number of sets is 1, the scanned-image processing unit 401 performs a compression process after an image compression rate is reduced and writes scanned image data in the image memory 119. When the compression rate is reduced in this way, a compressed image easily satisfies the designated compression rate, and accordingly, recompression is unlikely to be performed. Therefore, a processing time of the scanned-image processing unit 401 may be reduced on average.

Furthermore, since the scan process and the print process are performed in parallel, the processing time may be reduced when compared with a case where the print process is performed after the scan process is terminated. An example of the reduction of the processing time will be described in detail later with reference to FIG. 6.

Furthermore, since the image memory 119 is shared, access to the HDD 114 is not required in the copy process, and accordingly, the processing time may be reduced.

Furthermore, the print process 410 is performed in parallel with the scan process 400 while image data is stored in the HDD 114. This is because, if the print process 410 is not completed due to printer jam or the like, recovery is performed using the image data stored in the HDD 114.

Subsequently, the first copy process executed in step S303 of FIG. 3 described above will be described in detail with reference to flowcharts of FIGS. 5A and 5B. The scan process in the first copy process will be described with reference to FIG. 5A and the print process in the first copy process will be described with reference to FIG. 5B. Operations in steps are realized when the program stored in the HDD 114 is developed in the RAM 112 and executed by the CPU 111. Furthermore, in the first embodiment, the first copy process including a process of writing scanned image data in the image memory 119 and a process of reading and printing the written image data which are performed in parallel is described.

First, the scan process in the first copy process will be described with reference to FIG. 5A.

In step S501, the CPU 111 performs an image process setting for the first copy process. In particular, a low image compression rate is set for an image process to be performed in step S504 later. When the setting for the image process is terminated, the process proceeds to step S502.

In step S502, the CPU 111 waits for a video input start signal. The video input start signal is a hardware interrupt signal input from the scanner unit 130 through the device I/F 116 to the image processing unit 118. Input of video signals of a scanned image from the scanner unit 130 is started using the interrupt as a trigger. When it is determined that the video input start signal has been input (Yes in step S502), the CPU 111 proceeds to step S503. In the first copy process, the print process is also started at this timing.

When it is determined that the video input start signal has not been input in step S502 (No in step S502), the CPU 111 repeatedly performs the process in step S502 until the video input start signal is input.

In the process from step S503 to step S505, image data obtained by the scan process is successively processed. Specifically, in step S503, the scanner unit 130 performs the scan process as illustrated in FIG. 4 in accordance with an instruction issued by the CPU 111.

In step S504, as illustrated in FIG. 4, the scanned-image processing unit 401 included in the image processing unit 118 performs a scanned-image process. The CPU 111 causes the image processing unit 118 to execute the scanned-image process. Here, a process of compressing the scanned image data is also performed. Since the low compression rate is set for the compression in step S501, recompression is unlikely to be performed in step S504, and accordingly, a processing time may be reduced.

In step S505, the image data which has been subjected to the scanned-image process performed by the scanned-image processing unit 401 is stored in the image memory 119.

In step S506, the CPU 111 waits for a video input termination signal to be supplied from the image processing unit 118. The video input termination signal is a hardware interrupt signal internally generated by the image processing unit 118 in accordance with a setting value set in step S501 in advance. When it is determined that the video input termination signal has been input (Yes in step S506), the CPU 111 proceeds to step S507. When it is determined that the video input termination signal has not been input (No in step S506), the CPU 111 repeatedly performs the process in step S506 until the video input termination signal is input.

In step S507, the CPU 111 performs a termination process including a process of releasing resources of the scanned-image processing unit 401 and the image memory 119 and proceeds to step S508.

In step S508, the CPU 111 determines whether a next page exists. Specifically, when it is determined that a page (document) to be scanned by the scanner unit 130 remains (Yes in step S508), the CPU 111 returns to step S501 and the process from step S501 onward is performed. On the other hand, when it is determined that a page (document) to be scanned by the scanner unit 130 does not remain (No in step S508), the CPU 111 waits for termination of the print process, and thereafter, terminates the process in step S303 corresponding to the first copy process.

Note that, although not illustrated, when the development of the image data to be printed for one page in the image memory 119 is terminated in step S505, the CPU 111 performs a process of writing the image data to be printed in the HDD 114 in parallel with a process to be performed hereafter.

Next, the print process in the first copy process will be described with reference to FIG. 5B.

In step S511, the CPU 111 performs an image process setting for the first copy process. When the image process setting for the first copy process is terminated, the process proceeds to step S512.

In step S512, the CPU 111 waits for a video output start signal to be supplied from the printer unit 140. The video output start signal is a hardware interrupt signal supplied from the printer unit 140 through the device I/F 116 to the image processing unit 118. Output of video signals of a printing image to the printer unit 140 is started using the interrupt as a trigger. When it is determined that the video output start signal has been input (Yes in step S512), the CPU 111 proceeds to step S513. On the other hand, when it is determined that the video output start signal has not been input (No in step S512), the CPU 111 repeatedly performs the process in step S512 until the video output start signal is input. In the process from step S513 to step S515, image data read from the image memory 119 is successively processed.

In step S513, the CPU 111 reads the image data to be printed from the image memory 119 to the printing-image processing unit 411 and proceeds to step S514. After the image processing unit 118 performs a printing-image process in accordance with an instruction issued by the CPU 111 in step S514, the process proceeds to step S515. The printer unit 140 performs the print process of printing an image on a sheet in accordance with the scanned image data in step S515, and thereafter, the process proceeds to step S516.

In step S516, the CPU 111 waits for a video output termination signal to be supplied from the image processing unit 118. The video output termination signal is a hardware interrupt signal internally generated by the image processing unit 118 in accordance with a setting value set in step S511 in advance. When it is determined that the video output termination signal has been input (Yes in step S516), the CPU 111 proceeds to step S517. On the other hand, when it is determined that the video output termination signal has not been input (No in step S516), the CPU 111 repeatedly performs the process in step S516 until the video output termination signal is input.

In step S517, the CPU 111 performs a termination process including a process of releasing resources of the printing-image processing unit 411 and the image memory 119 and proceeds to step S518. In step S518, the CPU 111 determines whether a next page exists. Specifically, when it is determined that a page to be printed remains (Yes in step S518), the CPU 111 returns to step S511 and the process from step S511 onward is performed. On the other hand, when it is determined that a page to be printed does not remain (No in step S518), the CPU 111 terminates the print process included in the first copy process in step S303.

Next, an example of a timing chart of video input of scanning and video output of printing in the first copy process will be described with reference to FIG. 6. Note that, time advances from left to right as represented by an arrow mark in a time axis of the chart in FIG. 6. Hereinafter, in the first embodiment, timings in the first copy process including a process of writing scanned image data in the image memory 119 and a process of reading and printing the written image data which are performed in parallel are described in detail.

Figure 6:
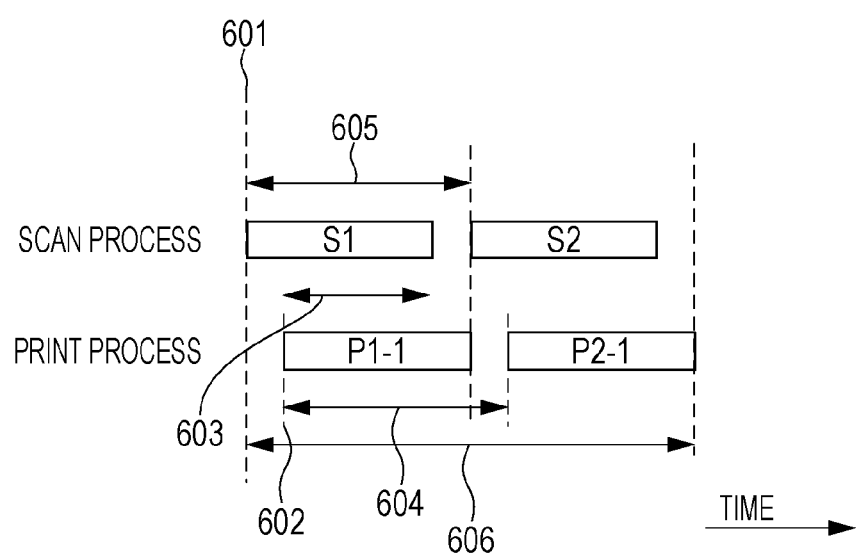
FIG. 6 is a timing chart of a scan process and a print process.

In the chart of FIG. 6, a state in which a copy job is input while two documents are placed on the document tray 205 of the document conveying apparatus 200 and the number of sets is set to 1 is illustrated.

In FIG. 6, portions denoted by "S1" and "S2" represent video input times of scanning of first and second documents. Furthermore, portions denoted by "P1-1" and "P2-1" represent video output times of printing.

Furthermore, a reference numeral 601 denotes a timing when a video input of the scanning of the first document (S1) is started. Furthermore, a reference numeral 602 denotes a timing when a video output of the printing of the first document (P1-1) is started. A period of time from the timing 601 to a time point when the video input time S1 is terminated corresponds to the process from step S502 to step S506 illustrated in FIG. 5A. A period of time from the timing 602 to a time point when the video output time P1-1 is terminated corresponds to the process from step S512 to step S516 illustrated in FIG. 5B.

In the first copy process, the MFP 100 starts the print process using the video input start timing 601 of the scanning as a trigger. Therefore, some time lag occurs between the timing 601 and the timing 602.

A reference numeral 603 denotes a period of time in which the video input of the scanning and the video output of the printing overlap with each other. The period of time 603 corresponds to a period of time in which the MFP 100 performs a copy parallel process. A reference numeral 604 denotes an interval between video output start timings of the pages to be printed. Although an interval between the video output time P1-1 and the video output time P2-1 is illustrated as a representative example in this embodiment, intervals between other pages may be similarly described.

A reference numeral 605 denotes an interval between video input start timings of the pages to be scanned. Although an interval between the video input time S1 and the video input time S2 is illustrated as a representative example in this embodiment, intervals between other pages may be similarly described. A reference numeral 606 denotes a processing time which is a period of time from when scanning is started on a first page to when printing is terminated on a last page.

As illustrated in FIG. 6, in the first copy process, since the scan process of the scanner unit 130 and the print process of the printer unit 140 are performed in parallel, the scan process and the print process overlap with each other in the period of time 603. By this, the print process may be performed earlier by the printer unit 140 by the period of time 603 when compared with a copy process method in which the print process is started after the scan process is terminated. As a result, the processing time 606 which is a period of time from when the copy process on a preset one set is started to when the copy process is terminated may be reduced (that is, the FCOT may be reduced).

Next, a flow of a second copy process performed by the image forming apparatus according to the first embodiment will be described with reference to FIG. 7. This example corresponds to a series of processes of the second copy process performed by the MFP 100. Here, the second copy process corresponds to a process performed when a copy job is input in a state in which two documents are placed on the document tray 205 of the document conveying apparatus 200 and the number of sets is 2. Hereinafter, the second copy process performed when the set number of sets is 2 or more will be described. In the second copy process in this embodiment, a compression rate which is higher than that of the first copy process is set before the copy process is performed on a first set. Note that, since scanned image data of the first set has been stored in the HDD 114, from a second copy onward, the stored image data is read from the HDD 114 and is printed.

Figure 7:
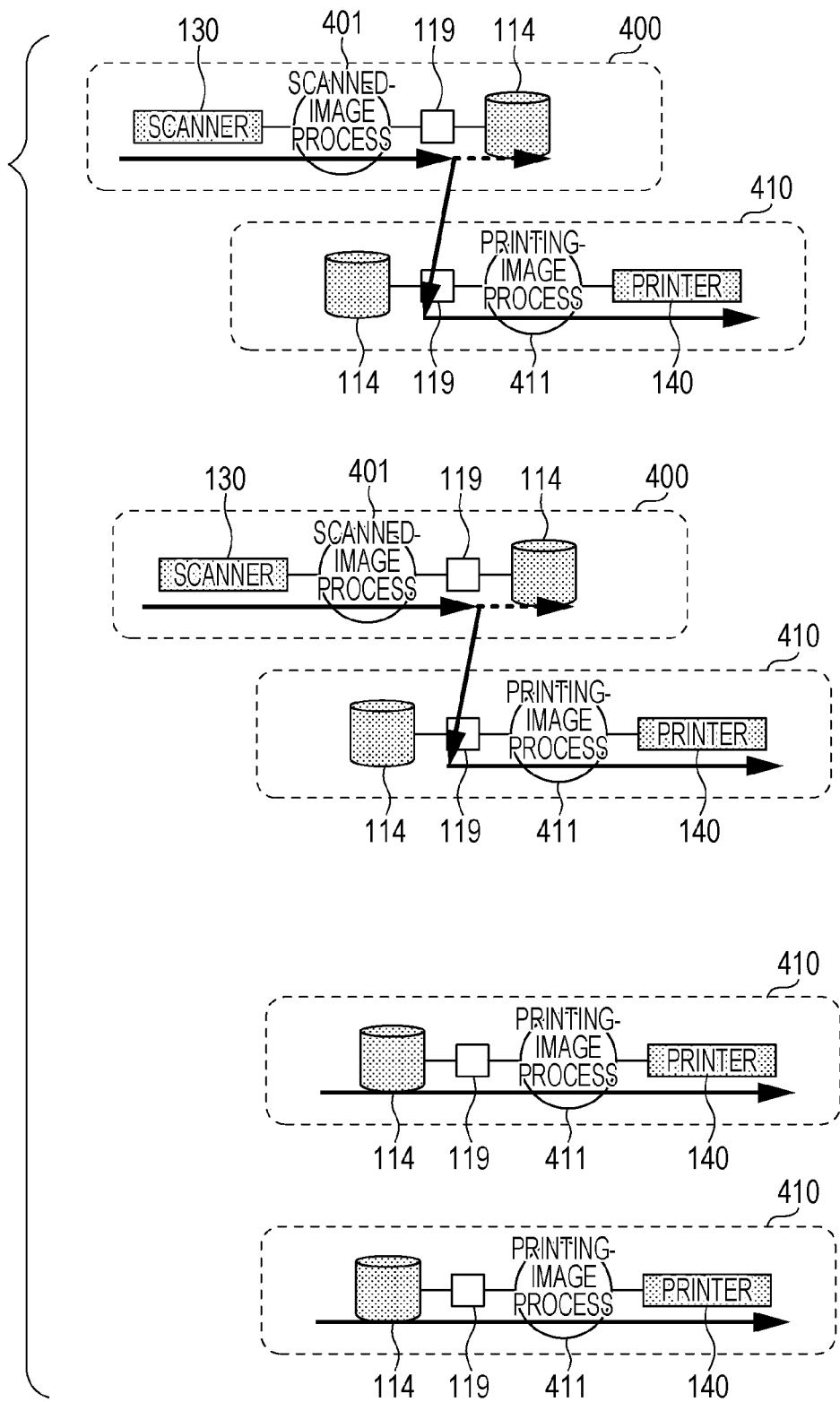
FIG. 7 is a diagram illustrating a processing order of a second copy process.

From the top of FIG. 7, a process performed on a first page of the first set, a process performed on a second page of the first set, a process performed on a first page of a second set, and a process performed on a second page of the second set are illustrated. A processing order of the second copy process performed by the MFP 100 is represented by arrow marks in FIG. 7.

The second copy process is different from the first copy process in which the copy process is performed for one set in that the scan process and the print process are not performed in parallel for each page. The second copy process is characterized in that image data is received and supplied using a memory shared by the scan process and the print process and the image data is compressed with a high compression rate in a scanned-image process. This process is executed when 2 or a larger number is set as the number of sets.

Note that, although a flow of a process performed on the first set is the same as that of the first copy process described above, the scanned-image processing unit 401 compresses image data with a compression rate higher than that of the first copy process. Furthermore, from a process performed on a second set onward, the scan process is not performed and only the print process is performed. Specifically, in the process performed on the second set onward, the image data stored in the HDD 114 is read and a process is performed on the read image data.

In the process performed on the first set, after writing by the scanned-image processing unit 401 is completed, reading to the printing-image processing unit 411 is started. In this way, the process is realized. While the print process is performed, the scan process is performed on the next page.

In the second copy process, the scanned-image processing unit 401 performs a compression process after an image compression rate is increased and writes scanned image data in the image memory 119. By increasing the compression rate in this way, the size of the image data is reduced. Therefore, in the print process performed on the second set onward, a period of time in which image data is developed from the HDD 114 to the image memory 119 and the developed image data is written in the image memory 119 is reduced. Furthermore, an amount of memory required for the copy process is reduced, and therefore, an amount of memory assigned to processes other than the copy process (such as reception of page description language (PDL) data transmitted from an external apparatus, such as a PC) may be easily secured.

Moreover, since the image memory 119 is shared, access to the HDD 114 is not required in the copy process performed on the first set, and therefore, the processing time is reduced. Furthermore, the print process 410 is performed in parallel with the scan process 400 while the image data is stored in the HDD 114. This is because the image data is to be used in the copy process performed on the second set onward.

Figure 8A:
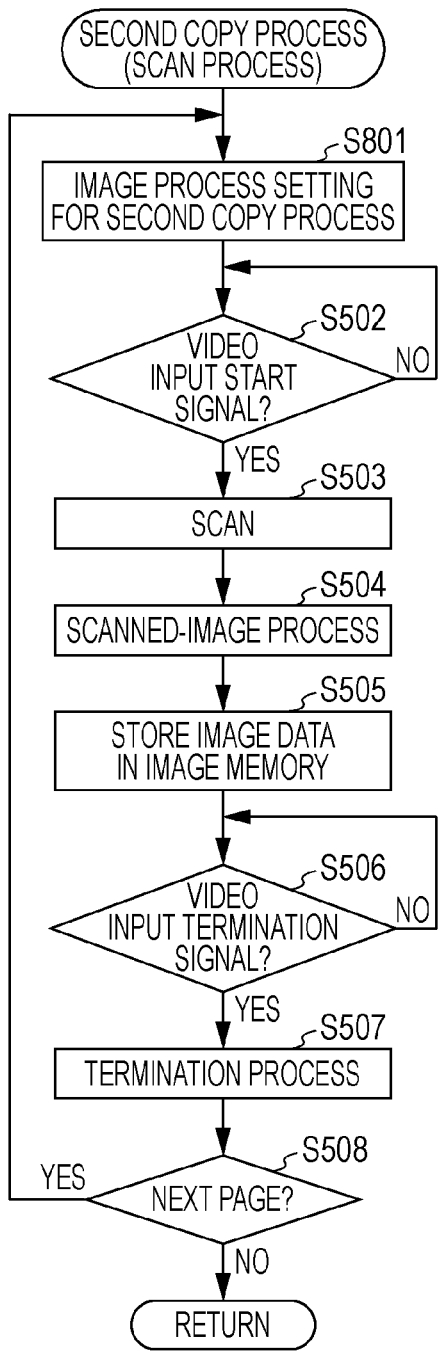
FIGS. 8A and 8B are flowcharts illustrating control operations according to the first embodiment.

Next, the second copy process executed in step S304 of FIG. 3 described above will be described in detail with reference to flowcharts of FIGS. 8A and 8B. Operations in steps are realized when the program stored in the HDD 114 is developed in the RAM 112 and executed by the CPU 111. Operations of the second copy process which are different from those of the first copy process described above are mainly described hereinafter.

First, the scan process in the second copy process will be described with reference to FIG. 8A.

In step S801, the CPU 111 performs an image process setting for the second copy process. In particular, a high image compression rate is set for an image process to be performed in step S504 of FIG. 8A. Note that the image compression rate for the image process in the second copy process is higher than that of the first copy process. When the image process setting is terminated in step S801, the process proceeds to step S502 of FIG. 8A. The process from step S502 to step S508 of FIG. 8A is the same as the process from step S502 to step S508 of FIG. 5A, and therefore, a detailed description thereof is omitted.

Next, the print process in the second copy process will be described with reference to FIG. 8B.

Figure 8B:
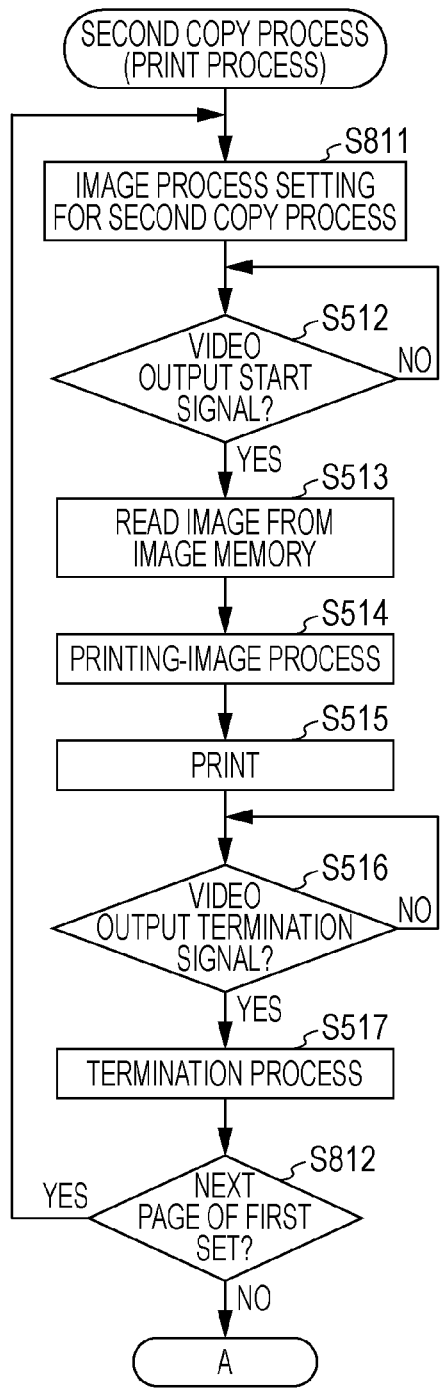

The CPU 111 performs an image process setting for the second copy process in step S811, and thereafter, proceeds to step S512 of FIG. 8B. The process from step S512 to step S517 of FIG. 8B is the same as the process from step S512 to step S517 of FIG. 5B, and therefore, a detailed description thereof is omitted. After the operation in step S517 of FIG. 8B is terminated, the process proceeds to step S812.

In step S812, the CPU 111 determines whether a next page of a first set exists. When it is determined that a page to be printed remains in the first set (Yes in step S812), the CPU 111 returns to step S811 and the process from step S811 onward is performed. On the other hand, when it is determined that a page to be printed does not remain in the first set (No in step S812), the CPU 111 proceeds to step S911 of FIG. 9 so as to perform the copy process on a second set onward.

Figure 9:
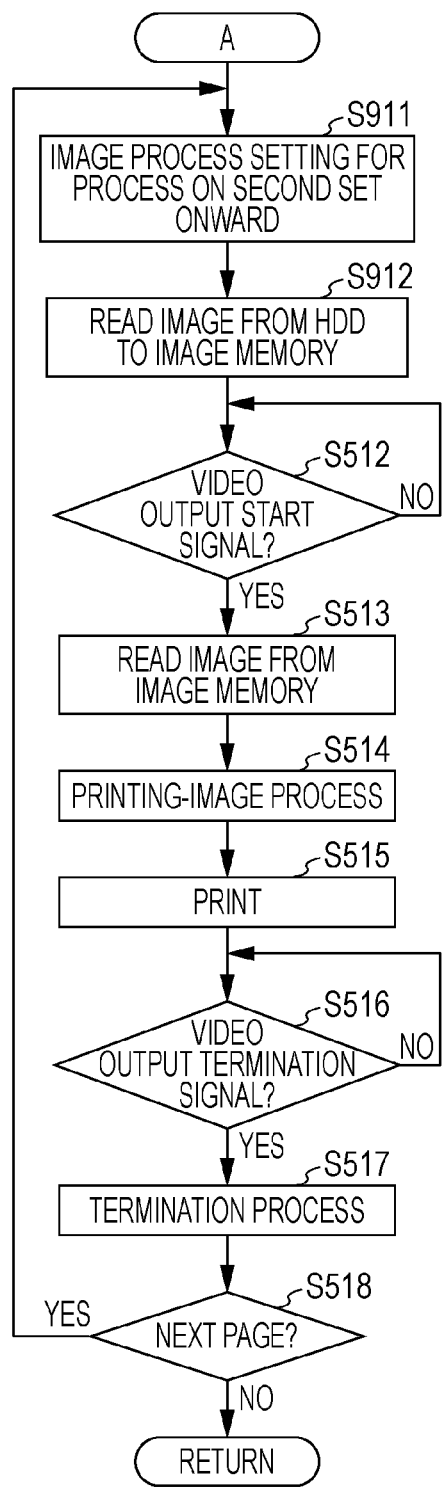
FIG. 9 is a flowchart illustrating a control operation according to the first embodiment.

Next, the print process performed on the second set onward in the second copy process will be described in detail with reference to a flowchart of FIG. 9. The process performed on the second set onward in the second copy process executed in step S304 of FIG. 3 is illustrated. Operations in steps are realized when the program stored in the HDD 114 is developed in the RAM 112 and executed by the CPU 111.

The CPU 111 performs an image process setting for the copy process performed on the second set onward in step S911, and thereafter, proceeds to step S912. In step S912, the CPU 111 reads image data to be printed from the image memory 114 and develops the image data in the image memory 119. After the development is completed, the process proceeds to step S512 of FIG. 9. The process from step S512 to step S518 of FIG. 9 is the same as the process from step S512 to step S518 of FIG. 5B, and therefore, a detailed description thereof is omitted.

Next, an example of a timing chart of video input of scanning and video output of printing in the second copy process will be described with reference to FIG. 10. Note that, time advances from left to right as represented by an arrow mark in a time axis of the chart in FIG. 10. Hereinafter, in the first embodiment, timings in the second copy process including a process of writing scanned image data in the image memory 119 and a process of reading and printing the written image data will be described in detail.

Figure 10:
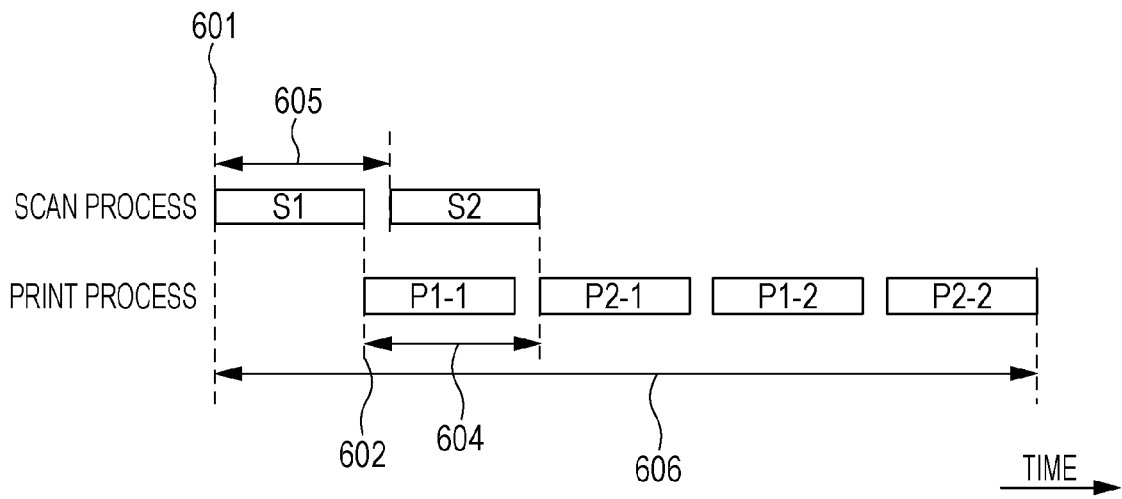
FIG. 10 is a timing chart of a scan process and a print process.

In the chart of FIG. 10, a state in which a copy job is input while two documents are placed on the document tray 205 of the document conveying apparatus 200 and the number of sets is set to 2 is illustrated.

In FIG. 10, portions denoted by "S1" and "S2" represent video input times of first and second documents of scanning. Furthermore, portions denoted by "P1-1" and "P2-2" represent video output times of printing. For example, a first number "2" in "P2-1" represents the number of pages and a second number "1" represents the number of sets.

The second copy process is different from the first copy process described above in that the video output time P1-1 is started when the video input time S1 is terminated. As illustrated in FIG. 10, after the video input time S1 is terminated, the termination process in step S507 of FIG. 8A is executed and the video input time S2 is started. After the video output time P1-1 is terminated, the termination process in step S517 of FIG. 8B is executed and the video output time P2-1 is started. The same operation is performed on the other pages.

As illustrated in FIG. 10, in the second copy process, unlike the first copy process, a period of time in which the scan process performed by the scanner unit 130 and the print process performed by the printer unit 140 overlap with each other which is to be generated when the scan process of the scanner unit 130 and the print process of the printer unit 140 are performed in parallel with each other does not exist. Therefore, a timing 602 when the print process is started in the second copy process delays relative to the same timing in the first copy process.

Image data for printing which is required for printing of a certain page is developed from the HDD 114 to the image memory 119 during the print process performed on a page immediately before the certain page. For example, image data for printing which is required for the video output time P1-2 is developed in printing in the video output time P2-1. Here, the image data for printing is stored in the HDD 114 after being subjected to high-compression in step S504 of FIG. 8A. Therefore, the development of the image data for printing which is required for the video output time P1-2 may be completed during the process in the video output time P2-1. If a low compression rate has been set, the development of the print image required for the video output time P1-2 may not be terminated during the process in the video output time P2-1, and therefore, a timing when the video output time P1-2 is started delays. Accordingly, by executing the process of increasing the compression rate in the process described above, the print process may be performed earlier on the second set onward.

As described above, the timing 602 when the print process is started in the second copy process delays relative to the same timing of the first copy process as described above. However, since the high compression rate is set in the second copy process as described above, a period of time required for the process performed on the second set onward may be reduced when compared with a case where a low compression rate is set. Accordingly, in the second copy process, as the number of sets is larger, the processing time 606 which is the period of time from when the copy process of a preset plurality of sets is started to when the copy process is terminated may be reduced by a larger amount in total.

Second Embodiment

In the second embodiment, when the number of sets is 2 or more, a third copy process which is different from the second copy process described in the first embodiment is performed. The third copy process is characterized in that, after image data which has been written in an image memory 119 is temporarily stored in an HDD 114, the image data read from the HDD 114 is output to a printer unit 140 which performs a copy process. The third copy process will be described in detail hereinafter with reference to FIGS. 11 to 14.

Figure 11:
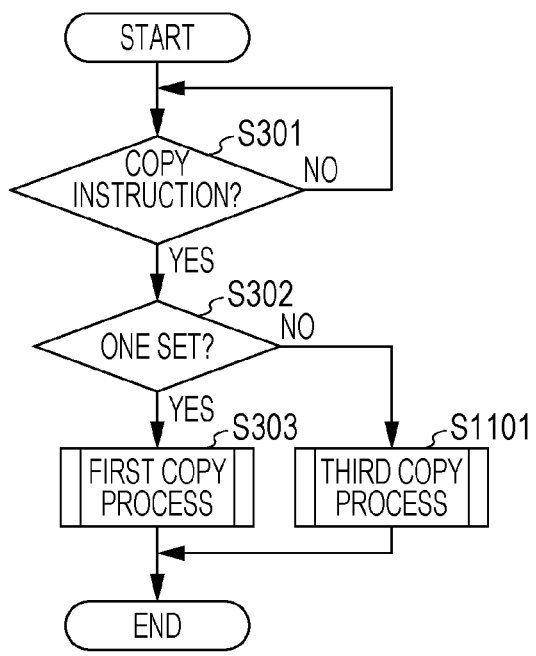
FIG. 11 is a flowchart illustrating a control operation according to a second embodiment.

FIG. 11 is a flowchart illustrating a method for controlling an image forming apparatus according to the second embodiment. In this processing example, an MFP 100 executes a copy job. Operations in steps are realized when a program stored in the HDD 114 is developed in a RAM 112 and executed by a CPU 111.

The process according to the second embodiment (FIG. 11) is different from the process according to the first embodiment (FIG. 3) in that, when it is determined that the number of sets is 2 or more (No in step S302), the CPU 111 proceeds to step S1101 and executes the third copy process described below. After the CPU 111 executes the third copy process in step S1101, this process is terminated. On the other hand, when it is determined that the number of sets is 1 in step S302 of FIG. 11 (Yes in step S302), the CPU 111 performs the first copy process described in the first embodiment. After the CPU 111 executes the first copy process in step S303, this process is terminated.

Figure 12:
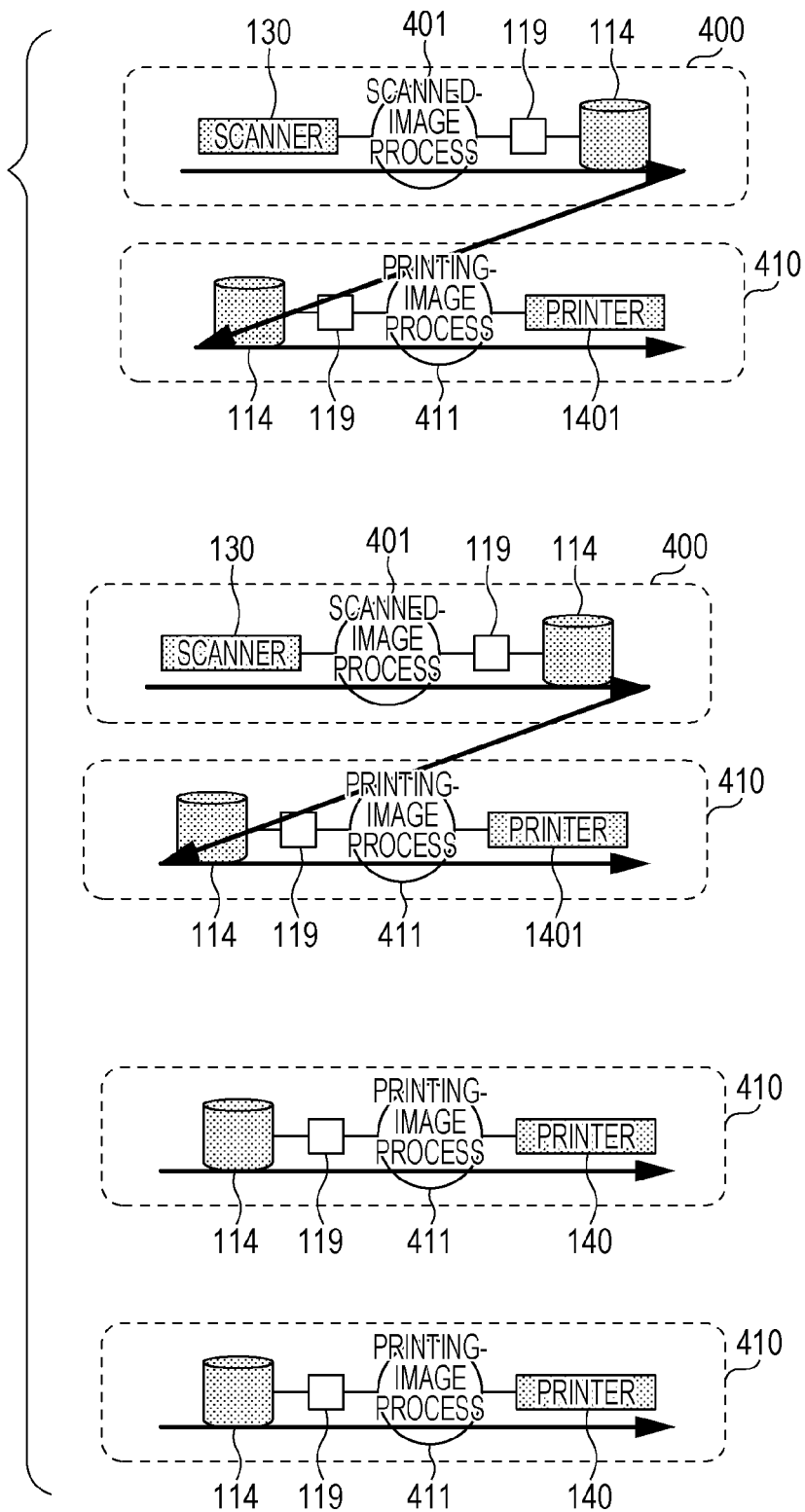
FIG. 12 is a diagram illustrating a processing order of a third copy process.

FIG. 12 is a diagram illustrating a processing order of the third copy process performed by the MFP 100 according to the second embodiment. A processing example of a copy process performed when a copy job is input in a state in which two documents are placed on a document tray 205 of a document conveying apparatus 200 and the number of sets is set to 2 is illustrated.

From the top of FIG. 12, a process performed on a first page of a first set, a process performed on a second page of the first set, a process performed on a first page of a second set, and a process performed on a second page of the second set are illustrated. A processing order of the third copy process performed by the MFP 100 is represented by arrow marks in FIG. 12.

The third copy process is different from the second copy process described above in that image data for printing is not transmitted and received using a memory shared by a scan process performed by a scanner unit 130 and a print process performed by the printer unit 140 when a first set is printed. However, the second embodiment is characterized in that image data stored in the HDD 114 in a scan process 400 is read and processed in a print process 410.

On the other hand, as with the second copy process, in the third copy process, compression is performed on image data with a high compression rate in a scanned-image process. This process is executed when 2 or a larger number is set as the number of sets.

In a first set, the CPU 111 starts the print process performed by the printer unit 140 after image data for printing is read from the image memory 119 and stored in the HDD 114. Then, the scanner unit 130 performs the scan process on a next page while the printer unit 140 performs the print process.

A process performed on a second set onward of the third copy process is the same as that of the second copy process.

In the third copy process, a scanned-image processing unit 401 performs a compression process after a compression rate for image data is increased and writes the image data to the image memory 119 and the HDD 114. In the second embodiment, by increasing the compression rate, the size of the image data is reduced. Therefore, in the print process performed by the printer unit 140, a period of time in which the image data is developed from the HDD 114 to the image memory 119 and the developed image data is written in the image memory 119 is reduced. Furthermore, an amount of memory required for the copy process is reduced, and therefore, an amount of memory assigned to processes other than the copy process (such as reception of PDL data transmitted from an external apparatus, such as a PC) may be easily secured.

Next, the third copy process executed in step S1101 of FIG. 11 described above will be described in detail with reference to flowcharts of FIGS. 13A and 13B. Operations in steps are realized when a program stored in the HDD 114 is developed in the RAM 112 and executed by the CPU 111. Operations of the third copy process which are different from those of the first copy process or the second copy process described above are mainly described hereinafter.

First, the scan process performed by the scanner unit 130 will be described with reference to FIG. 13A.

In step S1301, the CPU 111 performs an image process setting for the third copy process. In particular, a high image compression rate is set for an image process to be performed in step S504 of FIG. 13A. Note that the image compression rate for the image process in the third copy process is higher than that of the first copy process. When the image process setting is terminated in step S1301, the process proceeds to step S502 of FIG. 13A. The process from step S502 to step S506 of FIG. 13A is the same as the process from step S502 to step S506 of FIG. 5A, and therefore, a detailed description thereof is omitted. When a determination is affirmative in step S506 of FIG. 13A, the CPU 111 proceeds to step S1302.

Figure 13A:
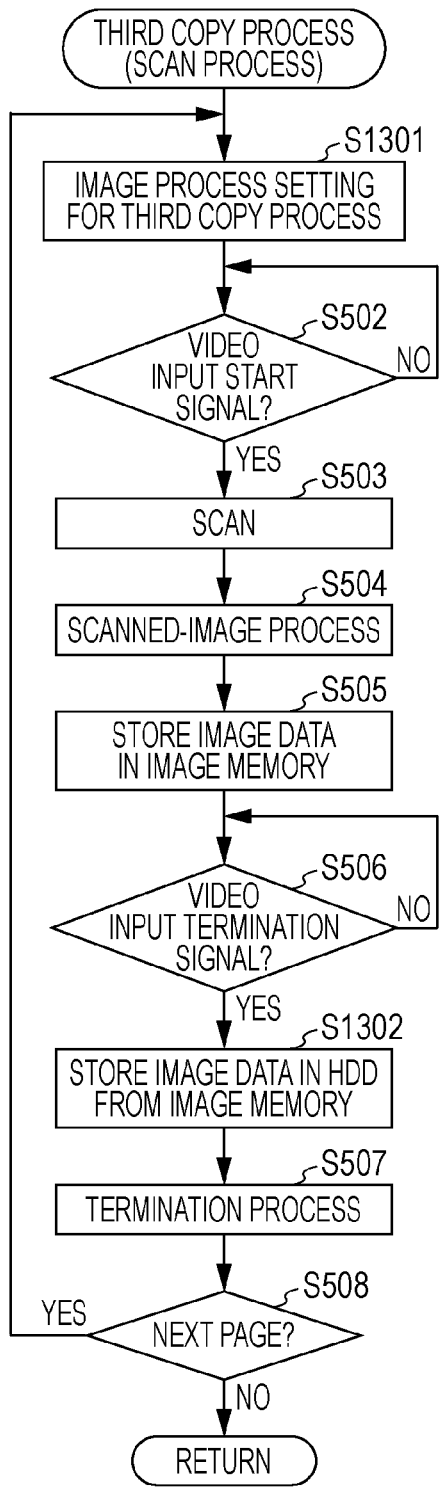
FIGS. 13A and 13B are flowcharts illustrating control operations according to the second embodiment.

After the image data developed in the image memory 119 in step S505 of FIG. 13A is stored in the HDD 114 in step S1302, the CPU 111 proceeds to step S507 of FIG. 13A. The process from step S507 to step S508 of FIG. 13A is the same as the process from step S507 to step S508 of FIG. 5A, and therefore, a detailed description thereof is omitted.

As described above, the process other than the process in step S1301 and step S1302 is the same as those of the first copy process and the second copy process.

Next, the print process in the third copy process will be described with reference to FIG. 13B.

Figure 13B:
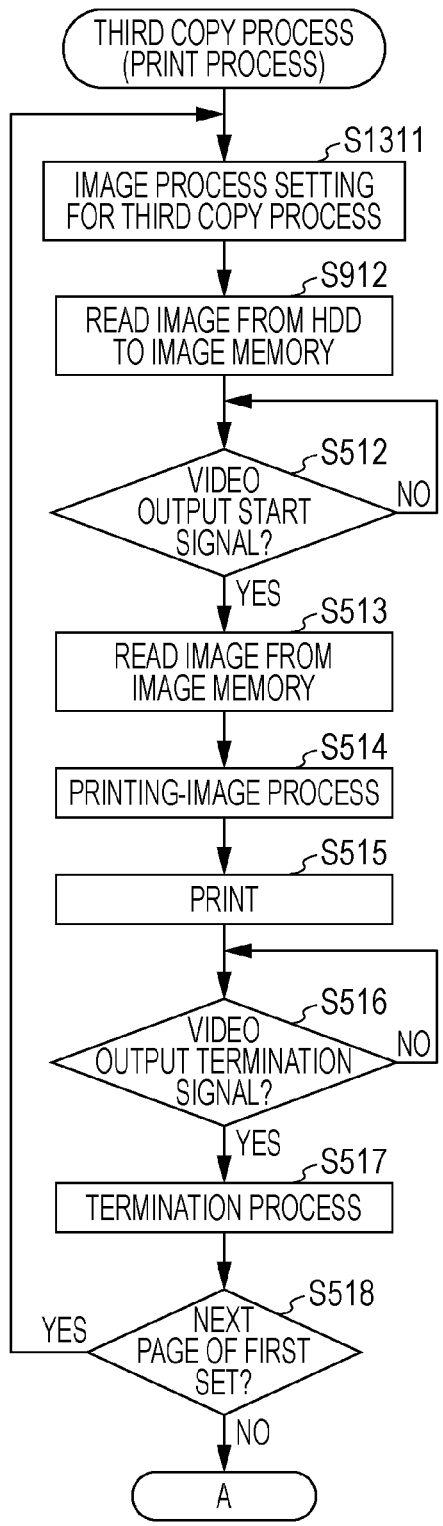

The CPU 111 performs an image process setting for the third copy process in step S1311, and thereafter, proceeds to step S912 of FIG. 13B. The process in step S912 of FIG. 13B is the same as the process in step S912 of FIG. 9, and therefore, a detailed description thereof is omitted. After the operation in step S912 of FIG. 13B is terminated, the process proceeds to step S512 of FIG. 13B. The process from step S512 to step S518 of FIG. 13B is the same as the process from step S512 to step S518 of FIG. 5B, and therefore, a detailed description thereof is omitted.

As described above, the process other than the process in step S1311 is the same as those of the first copy process and the second copy process. The print process performed on a second set onward is the same as that of the second copy process described above with reference to FIG. 9.

Next, an example of a timing chart of video input of scanning and video output of printing in the third copy process will be described with reference to FIG. 14. Note that, time advances from left to right as represented by an arrow mark in a time axis of the chart in FIG. 14.

Figure 14:
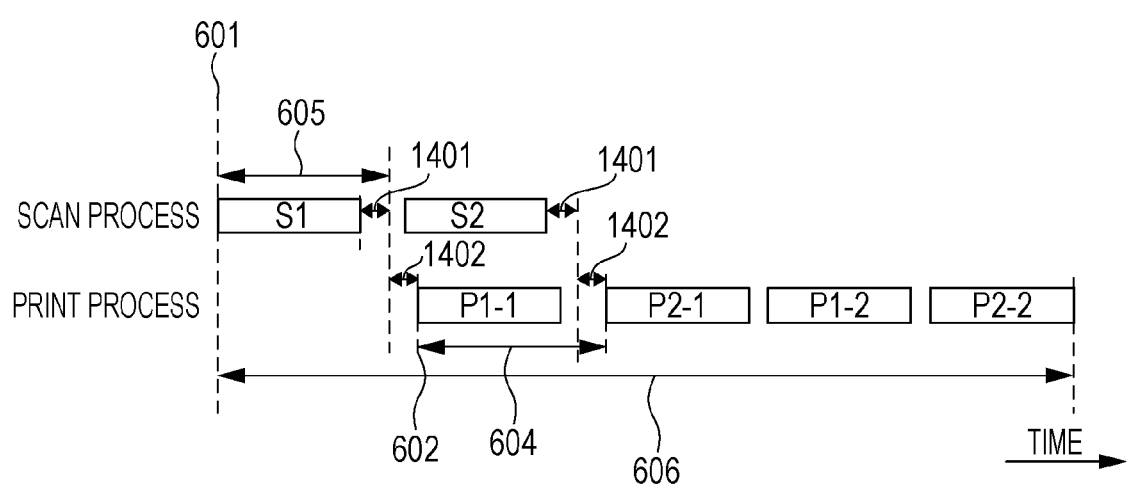
FIG. 14 is a timing chart of a scan process and a print process.

In the chart of FIG. 14, a state in which a copy job is input while two documents are placed on the document tray 205 of the document conveying apparatus 200 and the number of sets is set to 2 is illustrated.

In FIG. 14, portions denoted by "S1" and "S2" represent video input times of scanning of first and second documents, and portions denoted by "P1-1" to "P2-2" represent video output times of printing of the first and second documents. For example, a first number "2" in "P2-1" represents the number of pages and a second number "1" represents the number of sets.

A reference numeral 1401 represents an interval in which a process of storing image data for printing from the image memory 119 to the HDD 114 is performed. A reference numeral 1402 represents an interval in which a process of writing the image data for printing from the HDD 114 to the image memory 119 is performed.

The third copy process is different from the first and second copy processes described above in that the printer unit 140 performs the print process at a timing when the video input time S1 is terminated and the process of writing the image data for printing in the HDD 114 is terminated.

As illustrated in FIG. 14, after the video input time S1 is terminated, the image data for printing is stored in the HDD 114. Then the termination process in step S507 of FIG. 13A is executed, and thereafter, the video input time S2 is started. Subsequently, after development of the image data for printing to be used in the video output time P1-1 in the image memory 119 is completed, the video output time P1-1 is started. After the video output time P1-1 is terminated, the termination process in step S517 of FIG. 13B is executed.

Subsequently, after development of the image data for printing to be used in the video output time P2-1 in the image memory 119 is completed, the video output time P2-1 is started.

As with the second copy process, in the third copy process, the image data for printing is stored in the HDD 114 after being subjected to high-compression in step S504 of FIG. 13A. Therefore, when a second set onward is to be printed, development of image data for printing required for printing of individual pages from the HDD 114 to the image memory 119 may be performed in parallel with the print process performed on pages immediately before the individual pages. By this, an interval in which the process of developing the image data for printing is performed is not generated before the video output time P1-2 and the video output time P2-2 are started.

On the other hand, in the third copy process, unlike the first copy process, a period of time in which the scan process performed by the scanner unit 130 and the print process performed by the printer unit 140 overlap with each other which is to be generated since the scan process of the scanner unit 130 and the print process of the printer unit 140 are performed in parallel with each other is not generated. Therefore, a timing 602 when the print process is started in the third copy process delays relative to the same timing in the first copy process. Furthermore, in the third copy process, the timing 602 when the print process is started delays when compared with the second copy process by a sum of intervals 1401 and 1402 for developing the image data for printing.

Although the timing 602 when the print process is started in the third copy process delays relative to that in the first copy process as described above, a period of time required for the process performed on the second set onward may be reduced when compared with a case where a low compression rate is set. Accordingly, in the third copy process, as the number of sets becomes larger, a processing time 606 which is a period of time from when the process of performing the copy process on a preset plurality of sets is started to when the process is terminated may be reduced by a larger amount in total. On the other hand, the processing time 606 which is the period of time from when the process of performing the copy process on a preset plurality of sets is started to when the process is terminated in the second copy process is smaller than that of the third copy process.

Third Embodiment

A third embodiment is a different mode of the first embodiment described above. Hereinafter, portions of the third embodiment different from the first embodiment will be described. In the third embodiment, when the number of sets is 1, a first copy process is executed as follows. Scanned image data is written in an image memory 119 without compressing the image data and the written data is read and output to a printer unit 140 in parallel with the writing. When the number of sets is 2 or more, the first copy process is executed as follows. In a first set, scanned image data for one page is written in the image memory 119 after the image data is compressed, the written image data for one page is stored in an HDD 114, and the image data is output to the printer unit 140. Furthermore, in a process performed on a second set onward, a second copy process is performed as follows. The image data stored in the HDD 114 is output to the printer unit 140.

FIGS. 15A and 15B are flowcharts illustrating a method for controlling an image forming apparatus according to the third embodiment. This example corresponds to the first copy process executed in step S303 of FIG. 3. A first copy process according to the third embodiment will now be described in detail with reference to the flowcharts of FIGS. 15A and 15B. Operations in steps are realized when a program stored in the HDD 114 is developed in a RAM 112 and executed by a CPU 111. Operations of the third copy process which are different from those of the first copy process according to the first embodiment are mainly described hereinafter.

First, the first copy process (scan process) according to the third embodiment will be described with reference to FIG. 15A.

In step S1501, the CPU 111 performs an image process setting of the different mode for the first copy process. In particular, the CPU 111 performs the setting so that image data is not compressed when a scanned-image process is performed in step S504 of FIG. 15A. When the image process setting is terminated in step S1501, the process proceeds to step S502 of FIG. 15A. The process from step S502 to step S508 of FIG. 15A is the same as the process from step S502 to step S508 of FIG. 5A, and therefore, a detailed description thereof is omitted.

Next, the first copy process (print process) according to the third embodiment will be described with reference to FIG. 15B.

The CPU 111 performs an image process setting of the different mode for the first copy process according to the third embodiment in step S1511, and thereafter, proceeds to step S512 of FIG. 15B. The process from step S512 to step S518 of FIG. 15B is the same as the process from step S512 to step S518 of FIG. 5B, and therefore, a detailed description thereof is omitted.

In the first copy process according to the third embodiment, a compression process is not performed on image data, and therefore, unlike a case where a compression process is performed, a situation that the process is stopped owing to recompression which is to be performed since a compression rate of a compressed image is not equal to or smaller than a designated compression rate does not occur. Therefore, the copy process may be reliably executed fast.

The scan process of a scanner unit 130 and the print process of the printer unit 140 are performed in parallel. Accordingly, as with the first copy process, a processing time which is a period of time until an image based on image data generated by reading a document is printed on a sheet may be reduced.

FIGS. 16A and 16B are flowcharts illustrating a method for controlling the image forming apparatus according to the third embodiment. This example corresponds to the second copy process executed in step S304 of FIG. 3. A second copy process according to the third embodiment will be described in detail with reference to the flowcharts of FIGS. 16A and 16B. Operations in steps are realized when the program stored in the HDD 114 is developed in the RAM 112 and executed by the CPU 111. Operations of the second copy process which are different from those of the second copy process according to the first embodiment are mainly described hereinafter.

First, the second copy process (scan process) according to the third embodiment will be described with reference to FIG. 16A.

The CPU 111 performs an image process setting of the different mode for the second copy process. In particular, the CPU 111 performs the setting so that image data is compressed when the scanned-image process is performed in step S504 of FIG. 16A. When the image process setting is terminated in step S1601, the process proceeds to step S502 of FIG. 16A. The process from step S502 to step S508 of FIG. 16A is the same as the process from step S502 to step S508 of FIG. 5A, and therefore, a detailed description thereof is omitted.

Next, the second copy process (print process) according to the third embodiment will be described with reference to FIG. 16B.

The CPU 111 performs an image process setting of the different mode for the second copy process in step S1611, and thereafter, proceeds to step S512 of FIG. 16B. Note that a process from step S512 onward is the same as that of the second copy process (print process) according to the first embodiment, and therefore, a detailed description thereof is omitted.

Since image data is compressed in the second copy process according to the third embodiment, the size of image data which is stored in the HDD 114 and which is to be used in the print process performed on a second set onward may be reduced when compared with a case where the image data is not compressed.

Therefore, in the print process performed on the second set, image data for printing is developed in the image memory 119 and the developed image data is written in the image memory 119, and accordingly, the process does not delay. Specifically, a processing time 606 which is a period of time from when the process of copying a preset plurality of sets is started to when the process is terminated may be reduced.

Furthermore, an amount of required image memory may be reduced by the compression process. Therefore, an amount of memory assigned to processes other than the copy process (such as reception of PDL data transmitted from an external apparatus, such as a PC) may be easily secured when compared with a case where the compression process is not performed.

Fourth Embodiment

A fourth embodiment is a different mode of the second embodiment described above. Hereinafter, portions different from the second embodiment will be described. A first copy process according to the fourth embodiment is a different mode of the first copy process according to the second embodiment.

Figure 17A:
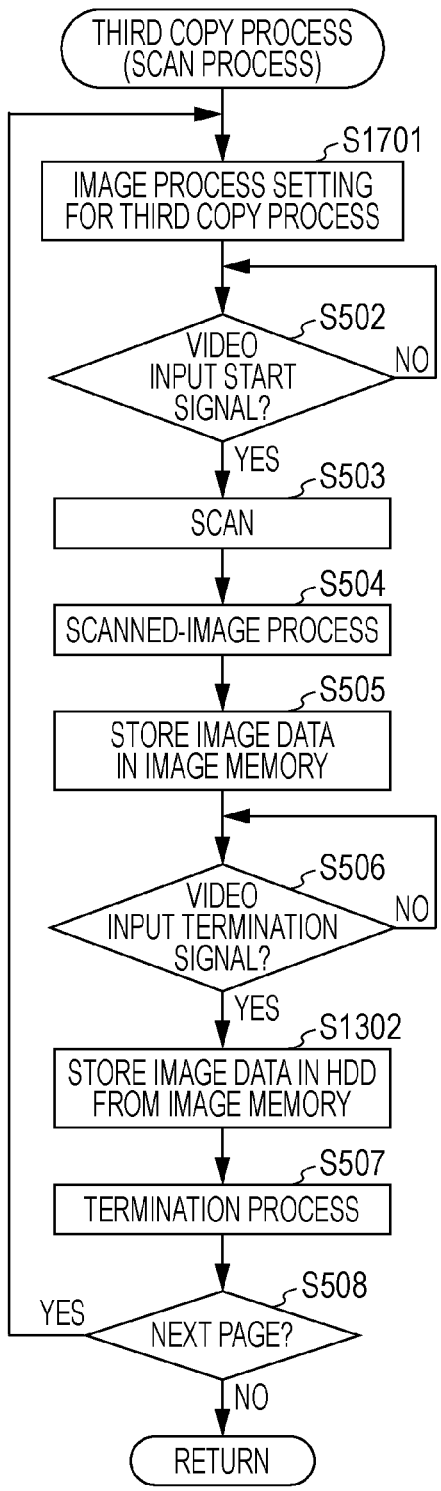
FIGS. 17A and 17B are flowcharts illustrating control operations according to a fourth embodiment.
Figure 17B:
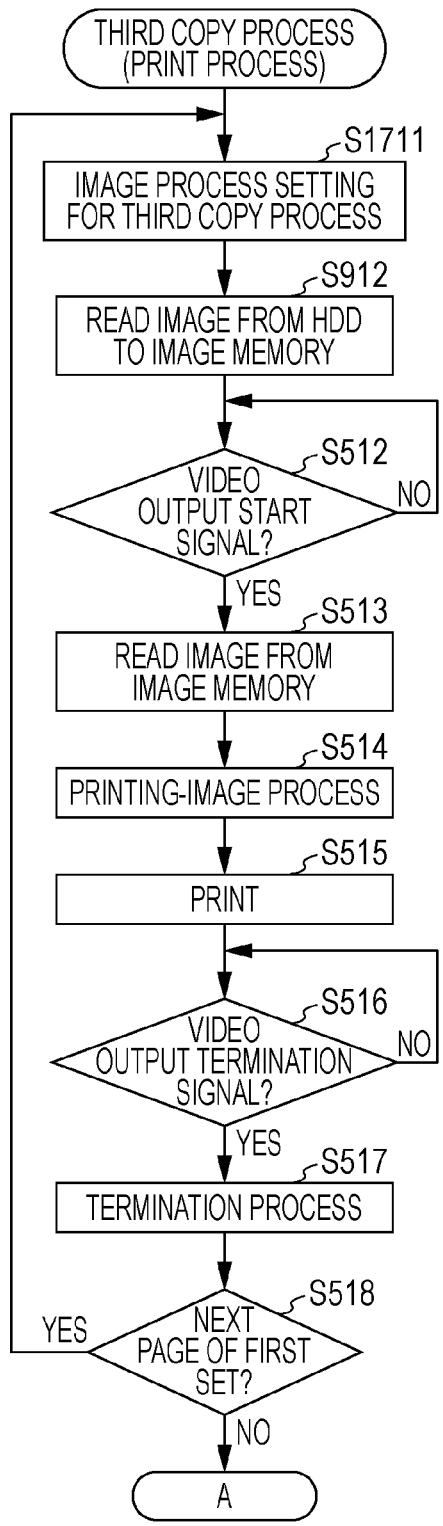

FIGS. 17A and 17B are flowcharts illustrating a method for controlling an image forming apparatus according to the fourth embodiment. This example corresponds to the third copy process executed in step S1101 of FIG. 11. A third copy process according to the fourth embodiment will be described in detail with reference to the flowcharts of FIGS. 17A and 17B. Operations in steps are realized when a program stored in the HDD 114 is developed in the RAM 112 and executed by the CPU 111. Operations of the third copy process which are different from those of the third copy process according to the second embodiment are mainly described hereinafter.

First, the third copy process (scan process) according to the fourth embodiment will be described with reference to FIG. 17A.

A CPU 111 performs an image process setting of the different mode for the third copy process in step S1701. In particular, the CPU 111 performs the setting so that image data is compressed when a scanned-image process is performed in step S504 of FIG. 17A. When the image process setting is terminated in step S1701, the process proceeds to step S502 of FIG. 17A. A process from step S502 to step S506 and a process from step S507 to step S508 of FIG. 17A are the same as the process from step S502 to step S506 and the process from step S507 to step S508 of FIG. 5A, and therefore, detailed descriptions thereof are omitted. Similarly, a process in step S1302 of FIG. 17B is the same as the process in step S1302 of FIG. 13A, and therefore, a detailed description thereof is omitted.

Next, the third copy process (print process) according to the fourth embodiment will be described with reference to FIG. 17B.

The CPU 111 performs an image process setting of the different mode for the third copy process in step S1711, and thereafter, proceeds to step S912 of FIG. 17B. The process in step S912 of FIG. 17B is the same as the process in step S912 of FIG. 9, and therefore, a detailed description thereof is omitted. The process from step S512 to step S518 of FIG. 17B is the same as the process from step S512 to step S518 of FIG. 5B, and therefore, a detailed description thereof is omitted.

Since image data is compressed in the fourth embodiment, the size of image data which is stored in the HDD 114 and which is to be used in the print process performed on a second set onward may be reduced when compared with a case where the image data is not compressed. Therefore, in the print process performed on the second set, image data for printing is developed in the image memory 119 and the developed image data is written in the image memory 119, and accordingly, the process does not delay. Specifically, a processing time 606 which is a period of time from when the process of copying a preset plurality of sets is started to when the process is terminated may be reduced.

Furthermore, an amount of required image memory may be reduced by the compression process. Therefore, an amount of memory assigned to processes other than the copy process (such as reception of PDL data transmitted from an external apparatus, such as a PC) may be easily secured when compared with a case where the compression process is not performed.

Fifth Embodiment

An MFP 100 is set such that, in a case where a print process of a printer unit 140 is started after a scanner unit 130 completes scanning on all documents (which is referred to as a "normal mode"), the scan process and the print process are not performed in parallel. Therefore, in a case where the setting of the MFP 100 is the normal mode, even when the number of sets is 1, the third copy process is executed instead of the first copy process in the first and second embodiments. In this way, since the printer unit 140 performs the print process after an image compression rate is increased in a scanned-image processing unit 401, a processing time for the copy process may be reduced.

On the other hand, in a case where the setting of the MFP 100 is the normal mode, even when the number of sets is 1, the different mode for the third copy process is executed instead of the first copy process in the third and fourth embodiments. In this way, since the printer unit 140 performs the print process after compression is performed on image data in a scanned-image processing unit 401, a processing time for the copy process may be reduced.

The various examples and the embodiments of the present invention have been described hereinabove. It will be obvious to those skilled in the art that the meanings and the scope of the present invention are not limited to the specific descriptions in this specification.

For example, although the case where the low-compression process is performed on image data which has been subjected to the scan process in the first copy process has been described, the present invention is not limited to this. The user may determine whether scanned image data is stored in the image memory 119 without compressing the image data or the scanned image data is stored in the image memory 119 after compressing the image data. Furthermore, the user may determine whether scanned image data is stored in the image memory 119 after the scanned image data is compressed in accordance with an image processing mode set to the scanner unit 130, a setting of a reading resolution for a color image, or a result of a determination as to whether a capacity of the image memory is equal to or larger than a predetermined threshold value.

Furthermore, although the CPU 111 of the controller 110 included in the MFP 100 leads the various control operations, some or all of the various control operations may be executed by a print control apparatus, such as an external controller, which is provided independently from the MFP 100.

Although the various examples and the various embodiments of the present invention are described hereinabove, it will be obvious to those skilled in the art that the meanings and the scope of the present invention are not limited to the specific descriptions in this specification. The present invention may be realized by a process of supplying a program which realizes at least one of the functions of the foregoing embodiments to a system or an apparatus through a network or a storage medium and reading and executing the program by at least one processor included in a computer of the system or the apparatus. Furthermore, the present invention may be realized by a circuit which realizes at least one of the functions (an application specific integrated circuit (ASIC), for example).

According to the present invention, a processing efficiency of a job may be improved by changing a compression rate used to compress image data generated by reading an image of a document in accordance with a result of a determination as to whether the preset number of sets is 1 in order to store the image data, for example.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-172354, filed Aug. 27, 2014, which is hereby incorporated by reference herein in its entirety.

What is claimed is:

1. An image processing apparatus which executes a copy job, comprising:
   a reader configured to read a document;
   a first storage unit configured to store image data of the document read by the reader;
   an image processor configured to compress the image data read from the first storage unit;
   a second storage unit configured to store the image data compressed by the image processor;
   a printer configured to execute printing based on the image data read from the first storage unit or the image data read from the second storage unit; and
   a user interface configured to receive a number of copies as setting of a copy job,
   wherein, in a case where the number of copies received by the user interface is a plurality of copies, the printer starts, based on the image data read from the first storage unit, printing of a first copy among the plurality of copies received by the user interface, and starts, based on the image data read from the second storage unit, printing of a second copy onward among the plurality of copies received by the user interface.

2. The image processing apparatus according to claim 1, wherein
   the reader reads a next document while the printer performs the printing based on the image data read from the first storage unit.

3. The image processing apparatus according to claim 1, wherein
   the first storage unit stores image data compressed with a first compression rate based on the image data of the document read by the reader in a case where the number of copies to be printed by the printer is 1, and stores image data compressed with a second compression rate which is higher than the first compression rate based on the image data of the document read by the reader in a case where the number of copies to be printed by the printer is not 1.

4. The image processing apparatus according to claim 1, wherein
   the first storage unit stores image data compressed with a first compression rate, and
   the second storage unit stores image data compressed with a second compression rate which is higher than the first compression rate.

5. The image processing apparatus according to claim 1, wherein
   the first storage unit stores uncompressed image data, and
   the second storage unit stores compressed image data.

6. A control method in an image processing apparatus which executes a copy job, the control method comprising:
   causing a reader to read a document;
   storing image data of the read document in a first storage unit;
   compressing the image data read from the first storage unit;

storing the compressed image data in a second storage unit;

causing a printer to execute printing based on the image data read from the first storage unit or the image data read from the second storage unit;

receiving, by a user interface, a number of copies as setting of a copy job, in a case where the number of copies received by the user interface is a plurality of copies, starting, based on the image data read from the first storage unit, printing of a first copy among the plurality of copies received by the user interface and starting, based on the image data read from the second storage unit, printing of a second copy onward among the plurality of copies received by the user interface.

7. A non-transitory computer readable storage medium for storing a computer program for controlling an image processing apparatus which executes a copy job, the computer program comprising:
   a first code to cause a reader to read a document;
   a second code to store image data of the read document in a first storage unit;
   a third code to cause an image processor to compress image data read from a first storage unit;
   a fourth code to store the compressed image data in a second storage unit;
   a fifth code to cause a printer to execute printing based on the image data read from the first storage unit or the image data read from the second storage unit;
   a sixth code to receive, by a user interface, a number of copies as setting of a copy job; and
   a seventh code to cause a printer to start, in a case where the number of copies received by the user interface is a plurality of copies, printing of a first copy among the plurality of copies received by the user interface based on the image data read from the first storage unit and cause the printer to start printing of a second copy onward among the plurality of copies received by the user interface based on the image data read from the second storage unit.

8. An image processing apparatus which executes a copy job, comprising:
   a reader configured to read a document;
   a first storage unit configured to store image data of the document read by the reader;
   an image processor configured to compress the image data read from the first storage unit;
   a second storage unit configured to store the image data compressed by the image processor;
   a printer configured to execute printing based on the image data read from the first storage unit or the image data read from the second storage unit; and
   a user interface configured to receive a number of copies as setting of a copy job,
   wherein, in a case where the number of copies received by the user interface is 1, the printer starts printing based on the image data read from the first storage unit, and
   wherein, in a case where the number of copies received by the user interface is two or more, the printer starts printing based on the image data read from the second storage unit.

9. The image processing apparatus according to claim 8, wherein
   the reader reads a next document while the printer performs the printing based on the image data read from the first storage unit.

10. The image processing apparatus according to claim 8, wherein
    the first storage unit stores image data compressed with a first compression rate based on the image data of the document read by the reader in a case where the number of copies to be printed by the printer is 1, and stores image data compressed with a second compression rate which is higher than the first compression rate based on the image data of the document read by the reader in a case where the number of copies to be printed by the printer is two or more.

11. The image processing apparatus according to claim 8, wherein
    the first storage unit stores image data compressed with a first compression rate, and
    the second storage unit stores image data compressed with a second compression rate which is higher than the first compression rate.

12. The image processing apparatus according to claim 8, wherein
    the first storage unit stores uncompressed image data, and
    the second storage unit stores compressed image data.

13. A control method in an image processing apparatus which executes a copy job, the control method comprising:
    causing a reader to read a document;
    storing image data of the read document in a first storage unit;
    compressing the image data read from the first storage unit;
    storing the compressed image data in a second storage unit;
    causing a printer to execute printing based on the image data read from the first storage unit or the image data read from the second storage unit;
    receiving, by a user interface, a number of copies as setting of a copy job;
    starting, in a case where the number of copies received by the user interface is 1, printing based on the image data read from the first storage unit; and
    starting, in a case where the number of copies received by the user interface is two or more, printing based on the image data read from the second storage unit.

14. A non-transitory computer readable storage medium for storing a computer program for controlling an image processing apparatus which executes a copy job, the computer program comprising:
    a first code to cause a reader to read a document;
    a second code to store image data of the read document in a first storage unit;
    a third code to cause an image processor to compress image data read from the first storage unit;
    a fourth code to store the compressed image data in a second storage unit;
    a fifth code to cause a printer to execute printing based on the image data read from the first storage unit or the image data read from the second storage unit;
    a sixth code to receive, by a user interface, a number of copies as setting of a copy job; and
    a seventh code to cause the printer to start, in a case where the number of copies received by the user interface is 1, printing based on the image data read from the first storage unit, and to cause the printer to start, in a case where the number of copies received by the user interface is two or more, printing based on the image data read from the second storage unit.

* * * * *